United States Patent
Eberts et al.

(10) Patent No.: US 10,252,486 B2
(45) Date of Patent: Apr. 9, 2019

(54) UTILITY MAT

(71) Applicants: James Eberts, Greentown, OH (US); Robert Beadnell, Greentown, OH (US)

(72) Inventors: James Eberts, Greentown, OH (US); Robert Beadnell, Greentown, OH (US)

(73) Assignee: B & JFM LLC, Greentown, OH (US)

( * ) Notice: Subject to any disclaimer, the term of this patent is extended or adjusted under 35 U.S.C. 154(b) by 305 days.

(21) Appl. No.: 15/014,806

(22) Filed: Feb. 3, 2016

(65) Prior Publication Data

US 2016/0229151 A1     Aug. 11, 2016

Related U.S. Application Data

(60) Provisional application No. 62/112,480, filed on Feb. 5, 2015.

(51) Int. Cl.
| | | |
|---|---|---|
| B32B 5/02 | (2006.01) | |
| A47G 27/02 | (2006.01) | |
| A47G 9/06 | (2006.01) | |
| B32B 7/12 | (2006.01) | |
| B32B 25/14 | (2006.01) | |

(Continued)

(52) U.S. Cl.
CPC ............. *B32B 5/022* (2013.01); *B32B 7/12* (2013.01); *B32B 25/10* (2013.01); *B32B 25/14* (2013.01); *A47G 9/062* (2013.01); *A47G 27/0237* (2013.01); *B32B 37/12* (2013.01); *B32B 2250/02* (2013.01); *B32B 2255/10* (2013.01); *B32B 2255/26* (2013.01); *B32B 2262/02* (2013.01); *B32B 2307/536* (2013.01); *B32B 2307/546* (2013.01); *B32B 2307/581* (2013.01); *B32B 2307/71* (2013.01); *B32B 2307/718* (2013.01); *B32B 2307/726* (2013.01); *B32B 2307/7265* (2013.01);
(Continued)

(58) Field of Classification Search
CPC .......... B32B 5/022; B32B 25/10; B32B 7/12; B32B 25/14; B32B 2307/7265; B32B 2471/04; B32B 2307/581; B32B 2307/546; B32B 2262/02; B32B 2255/26; B32B 2307/732; B32B 2307/718; B32B 2319/00; B32B 2307/71; B32B 2255/10; B32B 2250/02; B32B 37/12; B32B 2571/00; B32B 2307/726; B32B 2307/536; A47G 27/0237; A47G 9/062
USPC .......................................................... 156/60
See application file for complete search history.

(56) References Cited

U.S. PATENT DOCUMENTS

| | | | |
|---|---|---|---|
| 5,507,900 A | * | 4/1996 | Mohammed .............. B09B 1/00 156/157 |
| 6,425,873 B1 | * | 7/2002 | Marchitto .............. A61B 5/411 128/898 |

(Continued)

FOREIGN PATENT DOCUMENTS

WO    WO-03046099 A1 *  6/2003  ............. C08J 5/127

*Primary Examiner* — Michael N Orlando
*Assistant Examiner* — Christian Roldan
(74) *Attorney, Agent, or Firm* — Tarolli, Sundheim, Covell & Tummino LLP

(57) ABSTRACT

One example includes a utility mat. The utility mat includes a first material layer comprising a rubber material. The utility mat also includes a second material layer overlying the first material layer and comprising a geotextile material. The utility mat further includes an adhesive material configured to bond the first material layer and the second material layer together.

7 Claims, 5 Drawing Sheets

(51) Int. Cl.
 *B32B 25/10* (2006.01)
 *B32B 37/12* (2006.01)
(52) U.S. Cl.
 CPC ..... *B32B 2307/732* (2013.01); *B32B 2319/00* (2013.01); *B32B 2471/04* (2013.01); *B32B 2571/00* (2013.01)

(56) References Cited

U.S. PATENT DOCUMENTS 7,101,628 B2 * 9/2006 Peng ................ B32B 27/32
 428/516
2009/0100775 A1 * 4/2009 Trial ................ E04D 5/10
 52/408

* cited by examiner

UTILITY MAT

RELATED APPLICATIONS

This application claims priority from U.S. Provisional Patent Application Ser. No. 62/112,480, filed 5 Feb. 2015, which is incorporated herein in its entirety.

TECHNICAL FIELD

The present disclosure relates generally to sports/leisure/work equipment, and specifically to a utility mat.

BACKGROUND

Many activities, particularly those involving outdoor sports and leisure or work, require a person to place their body or equipment in contact with surfaces, natural or man-made, that can cause harm to their body or to apparel and/or equipment that is worn. As an example, in environments such as those in which people camp, hike, fish, or conduct other sport activities, people often have to lay, kneel, or stand on rocks or other surfaces that can be uncomfortable or even potential harmful to their bodies or equipment, such as on beds of rocks or other jagged surfaces. As another example, working outdoors can likewise place a person in a similar situation in skin or clothing can be damaged by exposure to natural or man-made environments. While care can be taken by an individual to attempt to mitigate harm or damage to themselves or their apparel, unintended consequences resulting in accidents can occur, particularly in situations requiring repeated occurrence of such activities.

SUMMARY

One example includes a utility mat. The utility mat includes a first material layer comprising a rubber material. The utility mat also includes a second material layer overlying the first material layer and comprising a geotextile material. The utility mat further includes an adhesive material configured to bond the first material layer and the second material layer together.

Another example includes a method for fabricating a utility mat. The method includes forming a first material layer comprising a rubber material having a predetermined length and a predetermined width. The method also includes forming a second material layer comprising a geotextile material having approximately the predetermined length and approximately the predetermined width. The method further includes bonding the second material layer to the first material layer via an adhesive material.

Another example includes a method for protecting at least one of bodily harm and damage to apparel. The method includes unfurling a utility mat from a furled state. The utility mat can include a first material layer comprising a rubber material that is bonded via an adhesive material to a second material layer comprising a geotextile material. The method also includes applying the unfurled utility mat to a terrain surface, such that the first material layer is in contact with the terrain surface while the second material layer is exposed opposite the terrain surface relative to the first material layer. The method further includes applying weight to the second material layer of the unfurled utility mat via at least one of anatomical skin, apparel, and equipment in contact with the second material layer. Therefore, the first material layer substantially mitigates damage of the at least one of the anatomical skin, apparel, and equipment via jagged surfaces associated with the terrain surface and the second material layer provides friction to maintain contact of the at least one of the anatomical skin, apparel, and equipment at a respective location on the second material layer.

DETAILED DESCRIPTION

The present disclosure relates generally to sports/leisure/work goods, and specifically to a utility mat. The utility mat can be implemented in a variety of applications, such as sports, leisure, labor, or any other activities in which it may be desirable to provide a surface on which to stand or apply body-weight without damaging apparel or injuring oneself. The utility mat includes a first material layer that can be formed from a rubber material, such as any of a variety of synthetic rubber materials that exhibit certain material properties. As an example, the first material layer can be selected to exhibit flexibility and puncture resistance, as well as being resistant to outdoor exposure (e.g., via ultraviolet radiation and ozone) and being safe for animal and plant life. For example, the first material layer can be formed from an ethylene propylene diene monomer (EPDM) rubber material. The utility mat also includes a second material layer overlying the first material layer and comprising a geotextile material. As an example, the geotextile layer can be nonwoven geotextile layer that is likewise selected to exhibit flexibility, and can also be selected to exhibit water filtering and drainage properties. Furthermore, the utility mat can include an adhesive material configured to bond the first material layer and the second material layer together. As an example, the adhesive material can be a slow-drying adhesive material that is water-resistant.

Figure 1:
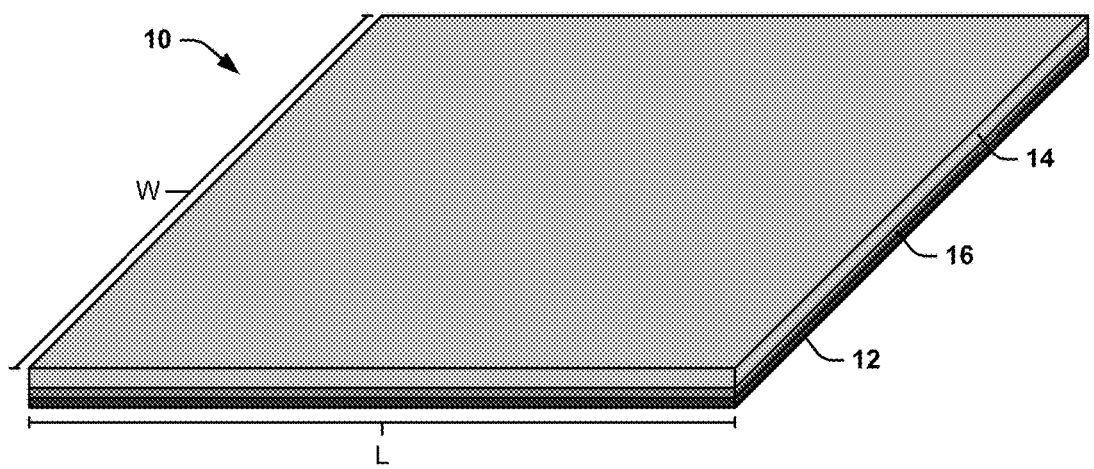
FIG. 1 illustrates an example of a utility mat.

FIG. 1 illustrates an example of a utility mat 10. The utility mat 10 is demonstrated in the example of FIG. 1 in a plan view, such that the utility mat 10 is arranged as a substantially flat mat upon which a user can stand, sit, lay, kneel, or otherwise apply body-weight or weight of equipment. The utility mat 10 can thus protect the user from characteristics of an external surface upon which the utility mat 10 is applied, such as jagged surfaces (e.g., resulting from rocks, glass, or other sharp abutments from or associated with the external surface). As an example, the utility mat 10 can have a length dimension "L" and a width dimension "W" that are suitable for an average user to have spatial capability to perform a variety of tasks while applying body-weight, such as dressing, undressing, shifting position, and other activities that may require the user to move but remain generally in contact with the utility mat 10.

The utility mat 10 includes a first material layer 12. The first material layer 12 can be formed from a rubber material, such as any of a variety of synthetic rubber materials that exhibit certain material properties. As an example, the first material layer 12 can be selected to exhibit flexibility and puncture-resistance. To maintain the properties of being both puncture-resistant and flexible, the first material layer 12 can be selected to have a Shore A hardness of between about 40 and about 90 and a thickness of between about 35 mil and about 75 mil.

The puncture resistant property of the first material layer 12 can be such that, during use of the utility mat 10, a surface of the first material layer 12 can be placed in contact with an terrain surface (e.g., ground, rocks, glass, or any of a variety of other surfaces on which contact with human skin or apparel is undesirable). The first material layer 12 can also be selected to be non-toxic, such as to animal and plant-life (e.g., in natural bodies of water). The first material layer 12 can also be resistant to outdoor exposure (e.g., via ultraviolet radiation and ozone). For example, the first material layer 12 can be suitable for a wide range of temperatures (e.g., about −40° F. to about 175° F.), and can be selected to be absent plasticizers that can embrittle with age to substantially mitigate cracks and splits resulting from age or exposure. As an example, the first material layer can be formed from an ethylene propylene diene monomer (EPDM) rubber material. However, other suitable rubber materials having similar properties can be implemented instead, such that the first material layer 12 is not limited to the use of an EPDM rubber material.

The utility mat 10 also includes a second material layer 14 overlying the first material layer 12. The second material layer 14 can be formed from a geotextile material (e.g., fabric) that, like the first material layer 12, is selected to exhibit flexibility. Based on the flexibility of the first and second material layers 12 and 14, the utility mat 10 can be configured to be folded or rolled for ease of storage, as described in greater detail herein. As an example, the second material layer 14 can be selected to exhibit water filtering and drainage properties, such that the second material layer 14 does not absorb water. Additionally, the second material layer 14 can be resistant to detrimental effects of ultraviolet radiation, and can be resistant to mold and other sources of decomposition or rotting, as well as being resistant to corrosion-causing agents (e.g., salt-water). For example, the second material layer 14 can be a non-woven geotextile material that can be formed from needle-punching, chemical bonding, heating, or entangling plastic fibers. For example, the second material layer 14 can be selected to have a fabric weight of between about 6 ounces and about 12 ounces. Therefore, by being selected as a non-woven geotextile material, the second material layer 14 can be substantially lightweight to reduce an overall weight of the utility mat 10, and can provide a comfortable surface of the second material layer 14 that can induce friction and water drainage, as described in greater detail herein.

As a result, during use of the utility mat 10, the second material layer 14 can be a surface upon which a user can stand, kneel, lay, or otherwise provide body-weight or weight of equipment or apparel. Thus, the user can contact a surface of the second material layer 14 with skin, apparel, or other materials for which damage from an external surface or elements is undesired. Thus, the geotextile material of the second material layer 14 can be selected for comfort, such as for contact with bare skin, and to provide a friction-providing surface to provide grip for maintaining position of contact surfaces of the user's skin or apparel to the utility mat 10. For example, because the second material layer 14 is selected for water filtering and drainage properties, moisture can substantially wick and drain away from the second material layer 14 to substantially mitigate pooling of water that can otherwise provide a slick surface on the first material layer 12, and thus allowing a user to maintain contact with the surface of the second material layer 14 even in the presence of water (e.g., rain, dew, run-off from apparel, or other causes of moisture).

The utility mat 10 also includes an adhesive layer 16 that physically interconnects the first and second material layers 12 and 14. The adhesive layer 16 thus bonds the first and second material layers 12 and 14 together to maintain the utility mat 10 as a singular unit. The adhesive layer 16 can be formed from any of a variety of adhesives that can exhibit the properties of water-resistance, such as to maintain the bonding between the first and second material layers 12 and 14, even in the presence of, or submersion in, water. Thus, the water-resistance of the adhesive material layer 16 can substantially mitigate separation of the first and second material layers 12 and 14, particularly at the peripheral edges. As an example, the adhesive that forms the adhesive layer 16 can be provided as a slow-drying adhesive that can be flexible upon drying. Additionally, the adhesive layer 16 can be substantially uniform between the first and second material layers 12 and 14 to substantially mitigate separation of the first and second material layers 12 and 14 at any portion along the respective surfaces of the first and second material layers 12 and 14 that face each other. For example, the adhesive material layer 16 can be formed from a black splice adhesive.

As an example, to maintain the properties of slow-drying and water resistance, and to maintain sufficient bonding of the first material layer 12 (e.g., formed from an EPDM rubber material) and the second material layer 14 (e.g., formed from a non-woven geotextile material), the adhesive of the adhesive layer 16 can be applied via a rolling technique (e.g., using a $\frac{1}{16}^{th}$-inch nap roller) in a quantity that is sufficient to provide uniformity of contact between the first and second material layers 12 and 14 but in a quantity that is less than can cause the adhesive material to "bleed" through the second material layer 14. For example, the adhesive material can be applied such that a coating of the adhesive material can be provided that is no thicker than permissible by a given nap roller (e.g., a $\frac{1}{16}^{th}$-inch nap roller) in a single stroke, with multiple strokes being provided to ensure uniformity of application between the first material layer 12 and the second material layer 14.

Figure 2:
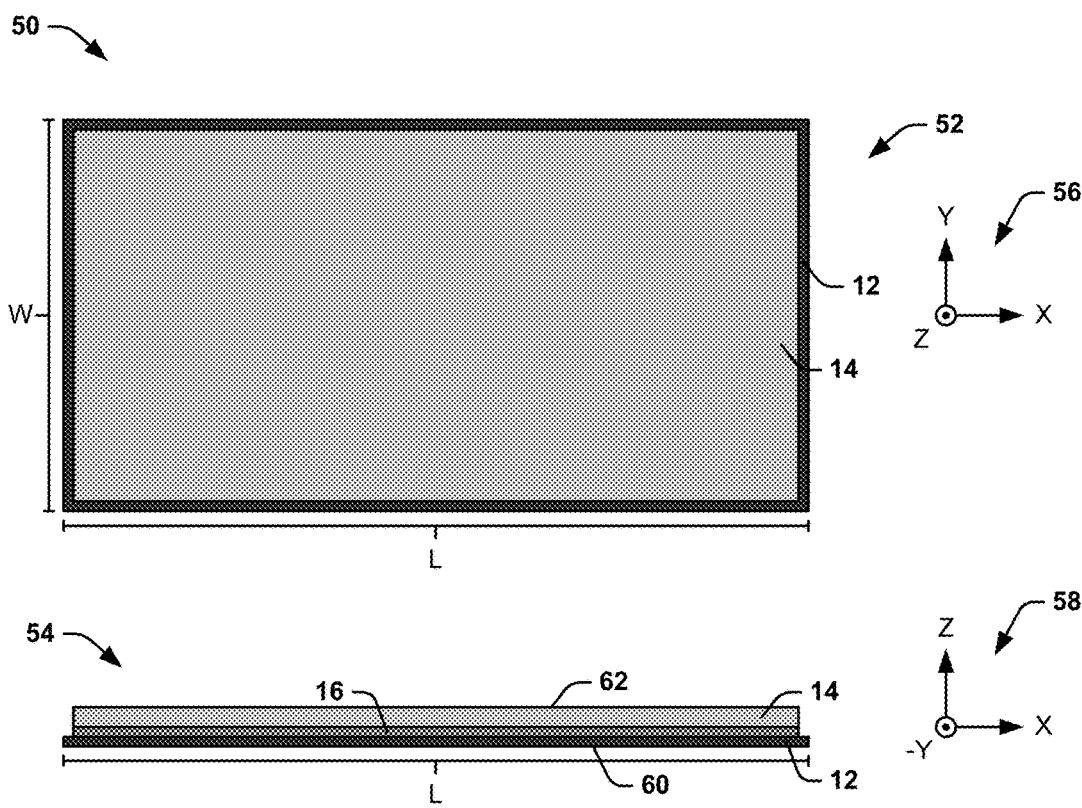
FIG. 2 illustrates an example diagram of a utility mat.

FIG. 2 illustrates an example diagram 50 of the utility mat 10. The diagram 50 thus demonstrates the utility mat 10 in the example of FIG. 1 in a first view 52 and a second view 54, and thus incorporates like reference numerals in the example of FIG. 2 as those used in the example of FIG. 1. The first view 52 of the utility mat 10 demonstrates the utility mat 10 in an "overhead" view, and thus as the substantially planar arrangement of the utility mat 10 occupying an XY-plane in Cartesian coordinate space, as demonstrated at 56. The second view 54 of the utility mat 10 demonstrates the utility mat 10 in a "side" view to show the first material layer 12, the second material layer 14, and the adhesive layer 16 interconnecting the first and second material layers 12 and 14 in a relative thickness extending along the Z-axis, as demonstrated at 58. While the utility mat 10 is demonstrated in the examples of FIGS. 1 and 2 as having relative dimensions with respect to the first and second material layers 12 and 14, as well as the adhesive material layer 16, it is to be understood that the utility mat 10 is not necessarily drawn to scale in the examples of FIGS. 1 and 2. Therefore, the relative thickness of the first and second material layers 12 and 14, as well as the adhesive material layer 16, can vary relative to that demonstrated in the examples of FIGS. 1 and 2.

The utility mat 10 is demonstrated in the first view 52 as having a substantially rectangular shape. As an example, the utility mat 10 can have a length dimension "L" and a width dimension "W" that are suitable for an average user to have spatial capability to perform a variety of tasks while applying body-weight, such as dressing, undressing, shifting position, and other activities that may require the user to move but remain generally in contact with the utility mat 10. As an example, the utility mat can have a length "L" that is approximately one meter and a width "W" that is approximately one-half of a meter. However, it is to be understood that the dimensions "L" and "W" can vary greatly, depending on the intended applications of the utility mat 10. In the example of FIG. 2, the utility mat 10 is demonstrated as a portion of the first material layer 12 extending farther than the second material layer 14 in both the X and Y-directions to form a "lip" around a periphery of the utility mat 10. However, it is to be understood that the second material layer 14 can also have dimensions that are approximately the same as the first material layer 12 in the X and Y-directions, such that the second material layer 14 has X and Y-dimensions that extend to the X and Y-edges of the first material layer 12. In addition, it is to be understood that the utility mat 10 is not limited to the rectangular shape, but could be any of a variety of polygonal shapes or shapes with rounded peripheral edges (e.g., circular, oval, or having rounded ends).

In the second view 54, the first material layer 12 is demonstrated as having thickness that is less than a thickness of the second material layer 14. As an example, the first material layer 12 can have a thickness of between about 35 mil and about 75 mil (e.g., approximately 45 mil). As another example, the second material layer 14 can have a thickness of between about 60 mil and about 200 mil (e.g., approximately 120 mil). Therefore, including the adhesive layer 16, the utility mat 10 can have a thickness of less than approximately 400 mil (e.g., approximately 200 mil). The second view 54 also demonstrates an exterior surface 60 of the first material layer 12 and an exterior surface 62 of the second material layer 14. The exterior surfaces 60 and 62 are exterior with respect to the adhesive layer 16 and are intended, for example, to be in contact with a terrain surface and a user, respectively. Because the exterior surface 62 corresponds to a top layer of the utility mat, and is formed from a geotextile material, the second material layer 14 can be printed with a logo, personalized, and/or colored to user specifications to increase an aesthetic aspect of the utility mat 10.

Figure 3:
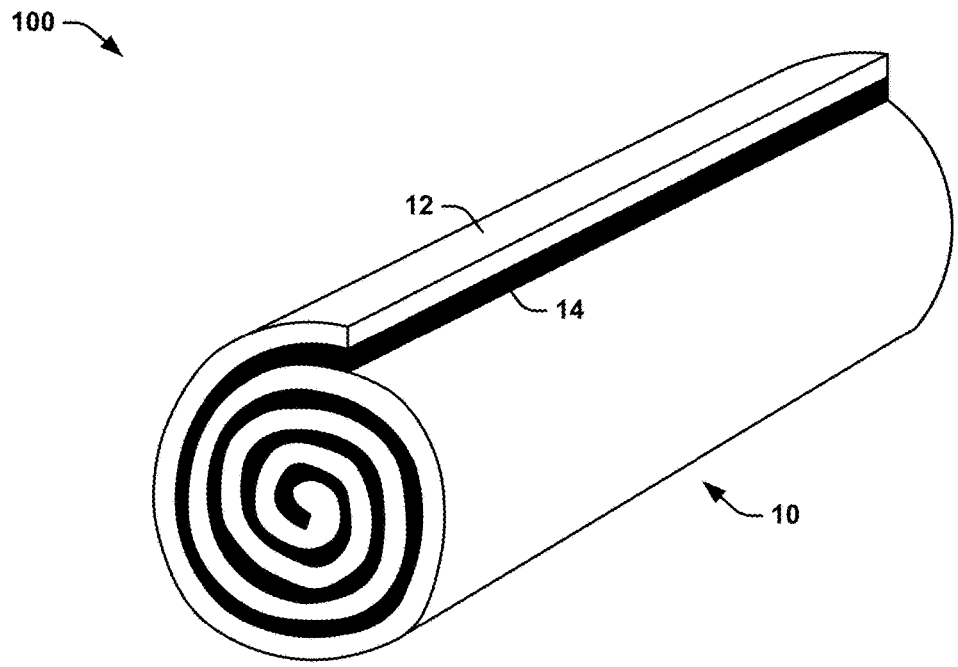
FIG. 3 illustrates another example of a utility mat.

Accordingly, based on the flexible properties of both the first material layer 12 and the second material layer 14, the utility mat 10 can be easily folded and/or rolled to be highly portable, such as demonstrated in the example of FIG. 3. FIG. 3 illustrates another example diagram 100 of the utility mat 10 in a rolled state. The diagram 100 demonstrates the utility mat 10 rolled such that the first material layer 12 and the second material layer 14 remain bonded together. While the adhesive layer 16 is not demonstrated in the example of FIG. 3, it is to be understood that the adhesive layer 16 can still be employed to bond the first and second material layers 12 and 14. Based on the capability of the utility mat 10 to be stored in a rolled or folded state, based on the flexibility of the first and second material layers 12 and 14, the utility mat 10 can be stored in a variety of places for use in sports, leisure, labor, or other activities. As an example, the utility mat 10 can be stored in an automobile trunk, a backpack, toolbox, or any other place suitable for use of the utility mat 10 in sports, leisure, labor, or other activities. While the utility mat 10 is demonstrated in the example of FIG. 3 as being rolled with the first material layer 12 being external and the second material layer 14 being internal with respect to the rolled state, it is to be understood that the rolling of the utility mat 10 can be reversed, such that the first material layer 12 can be internal and the second material layer 14 can be external.

Additionally, based on the combination of the first material layer 12 and the second material layer 14, as bonded together via the adhesive layer 16, the utility mat 10 can be configured as a portable and storable surface mat that can be implemented to protect a user from bodily harm or harm to apparel resulting from jagged surfaces on which the user can apply body-weight or weight of equipment or apparel in the sports, leisure, labor, or other activities. For example, the utility mat 10 can be unfurled from a stored state (e.g., rolled or folded) and placed upon a terrain surface (e.g., on a jagged surface of a given environment of use) via the exterior surface 60 of the first material layer 12 for a user to apply body-weight to the utility mat 10 via the exterior surface 62 of the second material layer 14. Therefore, the first material layer 12 can provide protection of the skin or apparel of the user from jagged surfaces associated with the terrain surface (e.g., rocks, pebbles, glass, metal shards, etc.) based on the puncture-resistant property of the first material layer 12. Additionally, the skin or apparel of the user can maintain contact with the exterior surface 62 of the second material layer 14 based on the friction-providing property of the second material layer 14, even in the presence of water or moisture that would cause the surface of the first material layer 12 to be slippery.

Figure 4:
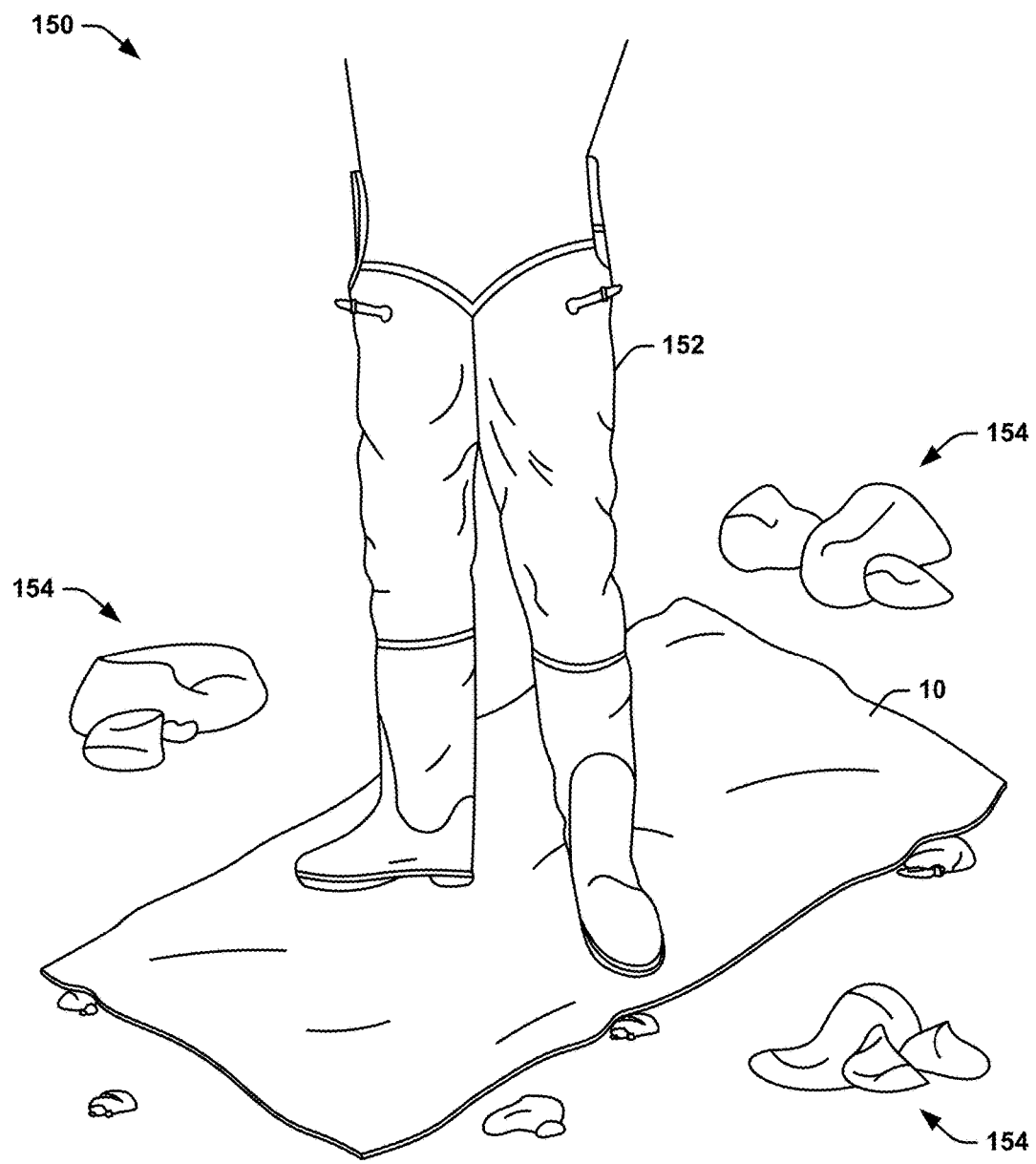
FIG. 4 illustrates an example diagram demonstrating use of a utility mat.
Figure 5:
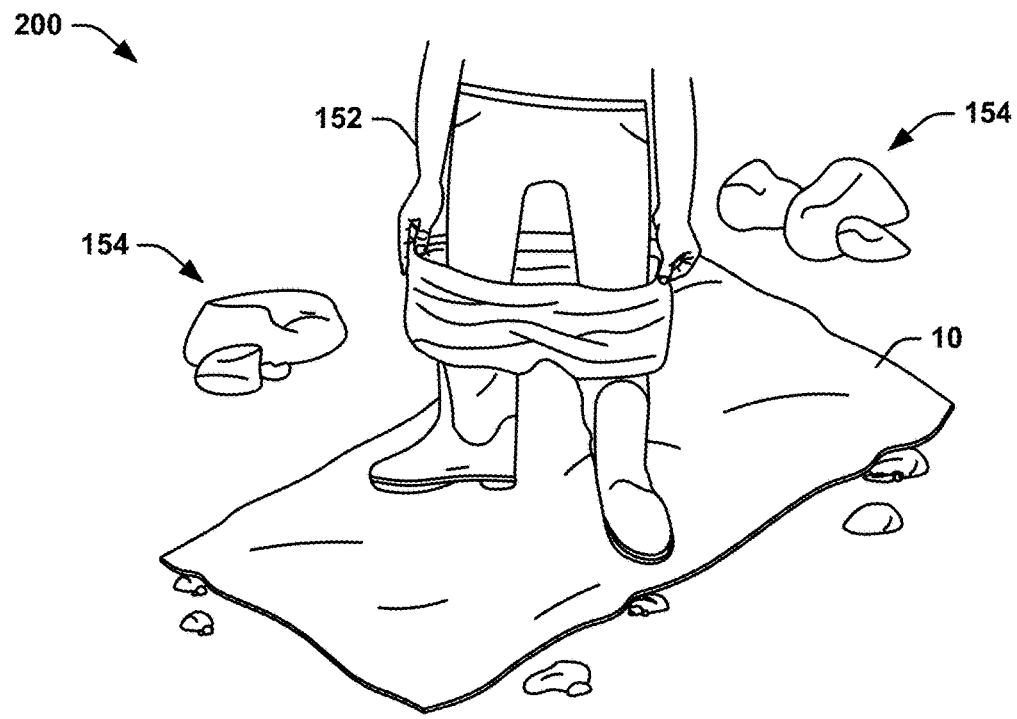
FIG. 5 illustrates another example diagram demonstrating use of a utility mat.
Figure 5:
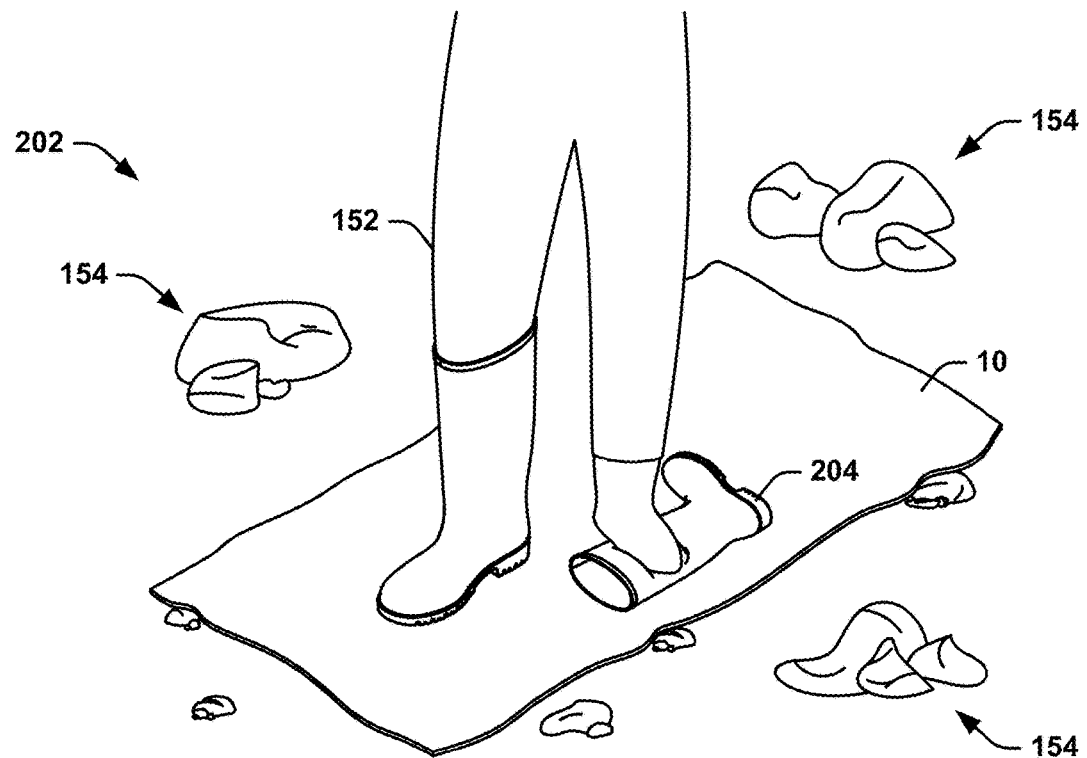

FIGS. 4 and 5 illustrate example diagrams demonstrating use of the utility mat 10. As described hereafter, reference is to be made to the examples of FIGS. 1-3 in the following description of FIGS. 4 and 5. FIG. 4 illustrates a diagram 150 of a silhouette of a fisherman (e.g., a fly-fisherman) 152 wearing waders and standing upon the utility mat 10. In the example of FIGS. 4 and 5, the utility mat 10 has been unfurled from a stored state (e.g., folded or rolled) and placed upon terrain (e.g., ground) that includes jagged rocks 154. As an example, in the example of FIG. 4, the utility mat 10 has been unfurled from the stored state and placed upon the ground via the exterior surface 60 of the first material layer 12, such that the exterior surface 60 of the first material layer 12 is in contact with the ground. Thus, the fisherman 152 applies his or her body-weight to the utility mat 10 by standing upon the utility mat 10, and in particular, standing upon the exterior surface 62 of the second material layer 14. Therefore, the fisherman 152 can stand on the utility mat 10 in a stable manner based on the friction provided by the second material layer 14, even with water run-off from the waders (e.g., after fishing in a river), while substantially preventing damage to the waders from the jagged rocks 154 based on the puncture-resistance provided by the first material layer 12 in contact with the jagged rocks 154.

FIG. 5 illustrates a first diagram 200 of the silhouette of the fisherman 152 removing the waders 152 and a second diagram 202 of the fisherman 152 standing upon a boot 204 (e.g., associated with or formed integrally with the waders). Therefore, the fisherman 152 uses the utility mat 10 to stand in a stable manner (e.g., based on the grip provided by the friction-surface of the second material layer 14) to mitigate harm to his or her feet (e.g., based on the puncture-resistance of the first material layer 12) while removing the waders and/or associated boots. In the second diagram 202, the fisherman 152 may have accidentally stepped-on the boot 204 while removing or after having removed the boot 204. Based on the puncture-resistance provided by the first material layer 12, the utility mat 10 thus mitigates damage to the boot 204 that could result from the fisherman 152 providing body-weight on the boot 204 over a jagged rock 154. In other words, because the fisherman 152 may have accidentally stepped-on the boot 204 while also standing on the utility mat 10, the utility mat 10 can substantially mitigate a puncture of the boot 204 by the jagged rocks 154, thus preventing the boot 204 from being ruined and unsuitable for use (e.g., as part of waders that are intended to keep the fisherman 152 dry in a river). Accordingly, the utility mat 10 can provide ease in the allowing the fisherman 152 to change into and out of waders and boots in natural terrain before and after the sport of fishing.

The examples of FIGS. 4 and 5 represent only one example of a large variety of uses of the utility mat 10. Additional examples could include kneeling on the utility mat 10 roadside while changing a tire, laying upon the utility mat 10 while the utility mat 10 lays upon rugged terrain, such as while repairing or inspecting machinery, covering exposed electrical wires that may otherwise come in contact with a user's hand, changing into or out of hiking boots or golf shoes, as a welcome mat to a tent or camping vehicle, stepping on carpet or flooring that may include broken glass, exposed nails, or carpet tacks, or any of a variety of other applications in which a user may want to protect his or her body or apparel from jagged or hazardous terrain while applying body-weight in a stable manner, even in the presence of moisture. The utility mat 10 is likewise not limited to use in supporting body-weight of a person, but could also be used to protect animals or other sensitive equipment. Additionally, the utility mat 10 can be implemented in any of a variety of other applications that may require puncture resistance and a durable base with a comfortable surface on which to rest weight (e.g., body-weight), such as on the surface of an outdoor deck, a garage floor, a basement floor, the floor of a vehicle, or any other floor or surface. Therefore, the uses of the utility mat 10 are in no way intended to be limited to as described herein.

Figure 6:
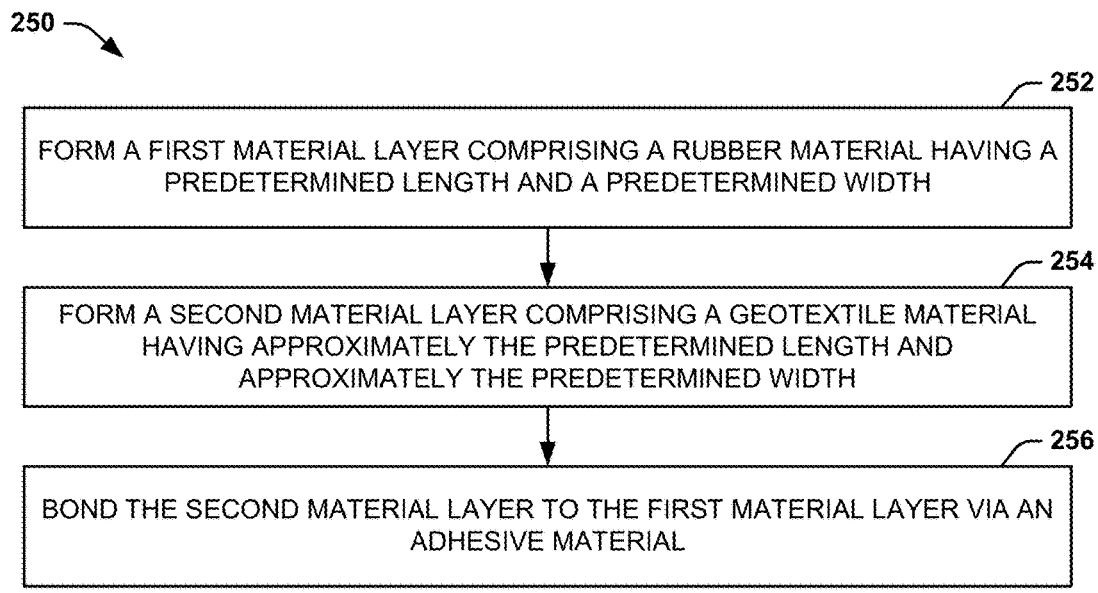
FIG. 6 illustrates an example of a method for fabricating a utility mat.
Figure 7:
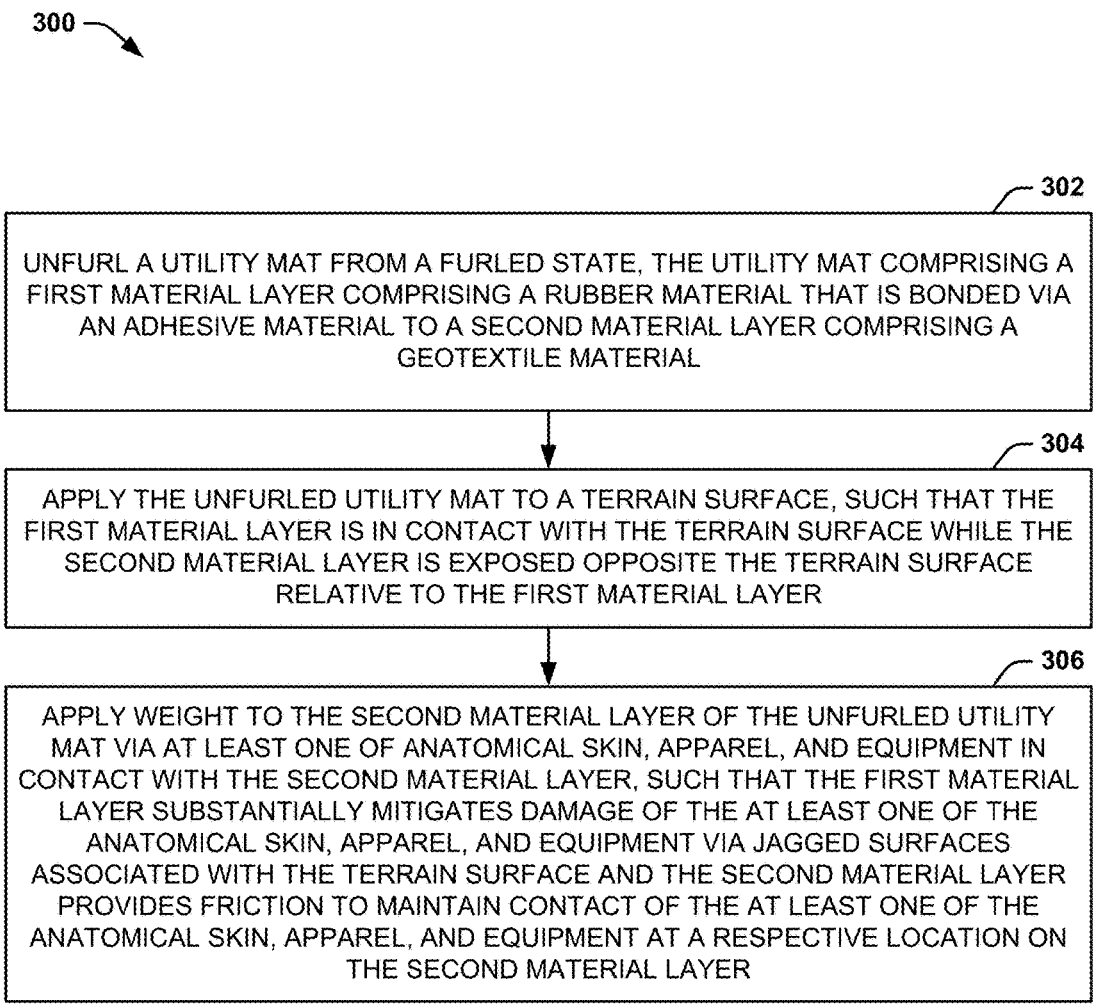
FIG. 7 illustrates an example of a method for protecting at least one of bodily harm and damage to apparel.

In view of the foregoing structural and functional features described above, a methodology in accordance with various aspects of the example embodiments will be better appreciated with reference to FIGS. 6 and 7. While, for purposes of simplicity of explanation, the methodologies of FIGS. 6 and 7 are shown and described as executing serially, it is to be understood and appreciated that the example embodiments are not limited by the illustrated order, as some aspects could, in accordance with the example embodiments, occur in different orders and/or concurrently with other aspects from that shown and described herein. Moreover, not all illustrated features may be required to implement a methodology in accordance with an aspect of the example embodiments.

FIG. 6 illustrates an example of a method 250 for fabricating a utility mat (e.g., the utility mat 10). At 252, a first material layer (e.g., the first material layer 12) comprising a rubber material (e.g., an EPDM rubber material) having a predetermined length and a predetermined width is formed. The predetermined length and width can correspond to dimensions suitable for an average user to have spatial capability to perform a variety of tasks while applying body-weight, such as dressing, undressing, shifting position, and other activities that may require the user to move but remain generally in contact with the utility mat. At 254, a second material layer (e.g., the second material layer 14) comprising a geotextile material (e.g., a non-woven geotextile layer) having approximately the predetermined length and approximately the predetermined width is formed. As an example, the first and second material layers can have the same length and width, or the first material layer can have a slightly larger length and/or width to form lip at or around at least one peripheral edge of the utility mat. At 256, the second material layer is bonded to the first material layer via an adhesive material (e.g., to form the adhesive layer 16). As an example, the adhesive material can be a slow-drying water-resistant adhesive material.

FIG. 6 illustrates an example of a method 300 for protecting at least one of bodily harm and damage to apparel. At 302, a utility mat is unfurled from a furled state (e.g., folded or rolled, such as in the rolled state in the example of FIG. 3). The utility mat can include a first material layer comprising a rubber material (e.g., an EPDM rubber material) that is bonded via an adhesive material (e.g., a slow-drying water-resistant adhesive material) to a second material layer comprising a geotextile material (e.g., a non-woven geotextile material). At 304, the unfurled utility mat is applied to a terrain surface (e.g., ground including the jagged rocks 154), such that the first material layer is in contact (e.g., via the exterior surface 60) with the terrain surface while the second material layer is exposed opposite the terrain surface relative to the first material layer (e.g., corresponding to the exterior surface 62). At 306, body-weight is applied to the second material layer (e.g., the exterior surface 62) of the unfurled utility mat via at least one of anatomical skin and apparel in contact with the second material layer, such that the first material layer substantially mitigates puncture of the at least one of the anatomical skin and the apparel via jagged surfaces associated with the terrain surface (e.g., the jagged rocks 154) and the second material layer provides friction to maintain contact of the at least one of the anatomical skin and the apparel at a respective location on the second material layer (e.g., in the presence of moisture).

What have been described above are examples of the example embodiments. It is, of course, not possible to describe every conceivable combination of components or methodologies for purposes of describing the example embodiments, but one of ordinary skill in the art will recognize that many further combinations and permutations of the example embodiments are possible. Accordingly, the example embodiments are intended to embrace all such alterations, modifications and variations that fall within the spirit and scope of the appended claims.

What is claimed is:

1. A utility mat comprising:
   a first material layer formed from an ethylene propylene diene monomer (EPDM) rubber material and comprising a first surface and a second surface opposite the first surface, wherein the first surface is exposed and wherein the rubber material is selected to have a Shore A hardness of between about 40 and about 90 and a thickness of between about 35 mils and about 75 mils;
   a second material layer overlying the first material layer and comprising a first surface and a second surface opposite the first surface, wherein the first surface is exposed, wherein the second material layer is formed from a unitary non-woven geotextile material based on at least one of needle-punching, chemical bonding, heating, or entangling plastic fibers, the second material layer being selected to have a fabric weight of between about 6 ounces and about 12 ounces, and is selected to have a thickness of between about 60 mils and about 200 mils and which is greater than the thickness of the first material layer; and a black splice slow-drying water-resistant adhesive material applied between the second surfaces of each of the first material layer and the second material layer having a thickness of between about 1 mil and 125 mils to bond the first material layer and the second material layer together, wherein the first material layer, the second material layer, and the adhesive material have a total combined thickness of between about 96 mils and about 400 mils and are configured to have flexibility and folding characteristics.

2. The utility mat of claim 1, wherein the rubber material of the first material layer and the geotextile material of the second material layer are each configured to provide protection from at least one of ultraviolet (UV) radiation, ozone, and exposure.

3. The utility mat of claim 1, wherein each of the rubber material of the first material layer and the geotextile material of the second material layer are configured to have resistance to punctures, mold, and corrosion.

4. The utility mat of claim 1, wherein the rubber material of the first material layer is configured to be non-toxic to plant and animal life in natural bodies of water.

5. The utility mat of claim 1, wherein the geotextile material of the second material layer is configured to filter and drain water.

6. A method for fabricating a utility mat, the method comprising:

forming a first material layer formed from an ethylene propylene diene monomer (EPDM) rubber material and comprising a first surface opposite the first surface, wherein the first surface is exposed and wherein the rubber material is selected to have a Shore A hardness of between about 40 and about 90 and thickness of between about 35 mils and about 75 mils;

forming a second material layer overlying the first material layer and comprising a first surface and a second surface opposite the first surface, wherein the first surface is exposed, wherein the second material layer is formed from a unitary non-woven geotextile material based on at least one of needle-punching, chemical bonding, heating, or entangling plastic fibers, the second material layer being selected to have a fabric weight of between about 6 ounces and about 12 ounces, and is selected to have a thickness of the first material layer; and bonding the second material layer to the first material layer via a black splice slow-drying adhesive material applied between the second surfaces of each of the first material layer and the second material layer having a thickness of between about 1 mil and 125 mils, wherein the first material layer, the second material layer, and the adhesive material have a total combined thickness of between about 96 mils and about 400 mils and are configured to have flexibility and folding characteristics.

7. A method for protecting at least one of bodily harm and damage to apparel, the method comprising:

unfurling a utility mat from a furled state, the utility mat comprising a first material layer formed from an ethylene propylene diene monomer (EPDM) rubber material and comprising a first surface and a second surface opposite the first surface, wherein the first surface is exposed and wherein the rubber material is selected to have a Shore A hardness of between about 40 and 90 and a thickness of between about 35 mils and about 75 mils, wherein a second material layer is bonded to the first material layer via a black splice slow-drying water-resistant adhesive material applied between the second surfaces of each of the first material layer and the second material layer having a thickness of between about 1 mil and 125 mils;

applying the unfurled utility mat to a terrain surface, such that the first material layer is in contact with the terrain surface while the second material layer is exposed opposite the terrain surface relative to the first material layer such that the second material layer is overlying the first material layer and comprising a first surface and second surface opposite the first surface wherein the first surface is exposed, wherein the second material layer is formed from a unitary non-woven geotextile material based on at least one of needle-punching, chemical bonding, heating, or entangling plastic fibers, the second material layer being selected to have a fabric weight of between 6 ounces and about 12 ounces, and is selected to have a thickness of between about 60 mils and about 200 mils and which is greater than the thickness of the first material layer; and applying weight to the second material layer of the unfurled utility mat via at least one of anatomical skin, apparel, and equipment in contact with the second material layer, such that the first material layer substantially mitigates damage of the at least one of the anatomical skin, apparel, and equipment via jagged surfaces associated with the terrain surface and the second material layer provides friction to maintain contact of the at least one of the anatomical skin, apparel, and equipment at a respective location on the second material layer, wherein the first material layer, the second material layer, and the adhesive material have a total combined thickness of between about 96 mils and about 400 mils and are configured to have flexibility and folding characteristics.

* * * * *